(12) United States Patent
 Puckett

(10) Patent No.: US 10,615,563 B2
(45) Date of Patent: Apr. 7, 2020

(54) BRILLOUIN GAIN SPECTRAL POSITION CONTROL OF CLADDINGS FOR TUNING ACOUSTO-OPTIC WAVEGUIDES

(71) Applicant: Honeywell International Inc., Morris Plains, NJ (US)

(72) Inventor: Matthew Wade Puckett, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/403,205

(22) Filed: May 3, 2019

(65) Prior Publication Data

US 2019/0267770 A1 Aug. 29, 2019

Related U.S. Application Data

(62) Division of application No. 15/630,261, filed on Jun. 22, 2017, now Pat. No. 10,312,658.

(51) Int. Cl.
 *H01S 3/30* (2006.01)
 *H01S 3/106* (2006.01)
 (Continued)

(52) U.S. Cl.
 CPC .......... *H01S 3/1068* (2013.01); *G01C 19/661* (2013.01); *G02F 1/125* (2013.01);
 (Continued)

(58) Field of Classification Search
 CPC .......... H01S 3/0637; H01S 3/083; H01S 3/30; G01C 19/66; G01C 19/72; G02F 1/125; G02F 1/365
 See application file for complete search history.

(56) References Cited

U.S. PATENT DOCUMENTS 3,856,378 A 12/1974 Brandt et al.
4,181,904 A 1/1980 Weller et al.
 (Continued)

FOREIGN PATENT DOCUMENTS

CN 104568383 A 4/2015
CN 104865637 A 8/2015
 (Continued)

OTHER PUBLICATIONS

Bauters, "Planar waveguides with less than 0.1 dB/m propagation loss fabricated with wafer bonding," Nov. 21, 2011, Optics Express, vol. 19, No. 24, 24090-24101. (Year: 2011).*
 (Continued)

*Primary Examiner* — Michael Carter
(74) *Attorney, Agent, or Firm* — Fogg & Powers LLC

(57) ABSTRACT

A method of fabricating an acousto-optic waveguide that includes a waveguide cladding surrounding an optical core is disclosed. The method comprises providing a wafer substrate; depositing an initial amount of a first material over an upper surface of the wafer substrate to form a partial cladding layer; depositing a second material over the partial cladding layer to form an optical layer; removing portions of the second material of the optical layer to expose portions of the partial cladding layer and form an optical core comprising the remaining second material; and depositing an additional amount of the first material over the optical core and the exposed portions of the partial cladding layer to form a full cladding layer that surrounds the optical core. A relative concentration of components of the first material is adjusted to provide Brillouin gain spectral position control of the waveguide cladding to tune the acousto-optic waveguide.

20 Claims, 5 Drawing Sheets

(51) Int. Cl.

| | | |
|---|---|---|
| *G02F 1/125* | (2006.01) | |
| *G02F 1/365* | (2006.01) | |
| *H01S 3/063* | (2006.01) | |
| *G01C 19/66* | (2006.01) | |
| *H01S 3/083* | (2006.01) | |
| *H01S 3/094* | (2006.01) | |
| *H01S 3/08* | (2006.01) | |

(52) U.S. Cl.
CPC ............ *G02F 1/365* (2013.01); *H01S 3/0635* (2013.01); *H01S 3/0637* (2013.01); *H01S 3/083* (2013.01); *H01S 3/094042* (2013.01); *H01S 3/094053* (2013.01); *H01S 3/30* (2013.01); *H01S 3/302* (2013.01); *H01S 3/08059* (2013.01); *H01S 3/094026* (2013.01)

(56) References Cited

U.S. PATENT DOCUMENTS

| | | |
|---|---|---|
| 5,131,060 A | 7/1992 | Sakata |
| 5,138,687 A | 8/1992 | Horie et al. |
| 5,170,457 A * | 12/1992 | Jen .......................... G02B 6/02 385/123 |
| 5,329,397 A | 7/1994 | Chang |
| 5,400,788 A | 3/1995 | Dias et al. |
| 5,511,142 A | 4/1996 | Horie et al. |
| 5,781,669 A | 7/1998 | Schmid et al. |
| 5,841,913 A | 11/1998 | Marcuse et al. |
| 6,052,215 A | 4/2000 | Montgomery et al. |
| 6,233,379 B1 | 5/2001 | Kim et al. |
| 6,253,002 B1 | 6/2001 | Kim et al. |
| 6,266,462 B1 | 7/2001 | Kim et al. |
| 6,282,332 B1 | 8/2001 | Bosso et al. |
| 6,510,261 B2 | 1/2003 | Sorin et al. |
| 6,535,665 B1 | 3/2003 | Kim et al. |
| 6,542,683 B1 | 4/2003 | Evans et al. |
| 6,587,623 B1 | 7/2003 | Papen et al. |
| 6,636,201 B1 | 10/2003 | Gomes et al. |
| 6,718,110 B2 | 4/2004 | Carmannini et al. |
| 6,925,216 B2 | 8/2005 | Vernon et al. |
| 6,929,899 B2 | 8/2005 | Pottebaum et al. |
| 6,999,639 B2 | 2/2006 | Tsarev |
| 7,016,586 B2 | 3/2006 | Zoorob et al. |
| 7,062,109 B2 | 6/2006 | Tsunoda et al. |
| 7,103,245 B2 | 9/2006 | Lee et al. |
| 7,174,080 B2 | 2/2007 | Walker |
| 7,376,317 B2 | 5/2008 | Yamada |
| 8,078,021 B2 | 12/2011 | Ushida |
| 8,442,368 B1 | 5/2013 | Reano et al. |
| 8,560,048 B2 | 10/2013 | Eberle et al. |
| 9,197,032 B2 | 11/2015 | Qiu et al. |
| 10,041,797 B2 | 8/2018 | Jain et al. |
| 2003/0156813 A1 | 8/2003 | Terakawa et al. |
| 2003/0161375 A1 | 8/2003 | Filgas et al. |
| 2003/0176002 A1 | 9/2003 | Zhang et al. |
| 2004/0037532 A1 | 2/2004 | Park et al. |
| 2004/0105485 A1 | 6/2004 | Bures et al. |
| 2005/0286826 A1 | 12/2005 | Tsunoda et al. |
| 2006/0037532 A1 | 2/2006 | Eidson |
| 2008/0013906 A1 | 1/2008 | Matsuo et al. |
| 2009/0148112 A1 | 6/2009 | Koyamada et al. |
| 2009/0263092 A1 | 10/2009 | Flammer et al. |
| 2010/0092132 A1 | 4/2010 | Ushida |
| 2010/0238538 A1 | 9/2010 | Rice et al. |
| 2011/0081123 A1 | 4/2011 | Pare et al. |
| 2012/0189258 A1 | 7/2012 | Overton et al. |
| 2013/0170802 A1 | 7/2013 | Pitwon |
| 2013/0188918 A1 | 7/2013 | Painchaud et al. |
| 2014/0320863 A1 | 10/2014 | Christensen et al. |
| 2015/0288135 A1 | 10/2015 | Qiu et al. |
| 2018/0081112 A1 | 3/2018 | Puckett et al. |
| 2018/0081113 A1 | 3/2018 | Puckett et al. |
| 2018/0081115 A1 | 3/2018 | Puckett et al. |
| 2018/0081205 A1 | 3/2018 | Puckett |
| 2018/0081206 A1 | 3/2018 | Puckett et al. |
| 2018/0375281 A1 | 12/2018 | Puckett |

FOREIGN PATENT DOCUMENTS

| | | |
|---|---|---|
| EP | 0642052 A1 | 3/1995 |
| EP | 0969297 A1 | 1/2000 |
| WO | 2004027476 A1 | 4/2004 |

OTHER PUBLICATIONS

Shibata, "Brillouin-gain spectra for single mode fibers having pure silica, GeO2-doped, and P2O5-doped cores," Apr. 1987, Optics Letters, vol. 12, No. 4, 269-271. (Year: 1987).*

Van Lear, Raphael et al., "Analysis of enhanced stimulated Brillouin scattering in silicon slot waveguides", Optics Letters, Mar. 1, 2014, pp. 1242-1245, vol. 39, No. 5, Publisher: Optical Society of America.

Wang, Zheng et al., "Slow light through tightly coupled light waves and acoustic waves in nanoscale waveguides", Proceedings of SPIE, SPIEDigitalLibrary.org/conference-proceedings-of-spie, Mar. 6, 2013, pp. 1-14, vol. 8636.

Wolff et al, "Germanium as a Material for Stimulated Brillouin Scattering in the Mid-infrared", Optics Express, Dated: Dec. 15, 2014, pp. 30735-30747, vol. 22, No. 25, Publisher: OSA.

Yasumoto et al, "Numerical Analysis of Two-Parallel Embedded Optical Waveguides", Journal Optical Society of America, Dated Sep. 1987, pp. 1713-1719, vol. 4, No. 9, Publisher: Optical Society of America.

Yasuura et al, "Numerical Analysis of Thin-Film Waveguide by Mode-Matching Method", Journal Optical Society of America, Dated Feb. 1980, pp. 183-191, vol. 70, No. 2 Publisher: Optical Society of America.

Zhang, Ruiwen et al., "Analysis of acousto-optic interaction based on forward stimulated Brillouin scattering in hybrid phononic-photonic waveguides", Optics Express, Jun. 13, 2016, pp. 13051-13059, vol. 24, No. 12.

Ashraf Mohamedelhassan, "Fabrication of Ridge Waveguides in Lithium Niobate", Printed by Universitetsservice US AB, 2012, pp. i-58, No. ISSN: 0280-316X, Publisher: Royal Institute of Technology KTH, Published in: Stockholm, Sweden.

Barrios; "Optical Slot-Waveguide Based Biochemical Sensors", Sensors, www.mdpi.com/journal/sensors, Jun. 16, 2009, pp. 4751-4765.

Bauters et al., "Planar Waveguides With Less Than 0.1 dB/m Propagation Loss Fabricated With Wafer Bonding", https://doi.org/10.1364/OE.19.024090, 2011, pp. 1-12, Publisher: Optical Society of America.

Bian et al., "Design of a Polymer-filled Silicon Nitride strip/slot asymmetric hybrid waveguide for realizing both flat dispersioin and athermal operation", Applied Optics, Jun. 20, 2016, pp. 4827-4832, vol. 55, No. 18, Publisher: Optical Society of America.

Bogaerts, Wim et al. "Silicon microring resonators"; Laser Photonics Rev. 6, No. 1, pp. 47-73 (2012); www.lpr-journal.org.

Courjal et al, "High Aspect Ratio Lithium Niobate Ridge Waveguides Fabricated by Optical Grade Dicing", Journal of Physics, https://hal.archives-ouvertes.fr/hal-00637796, Dated Nov. 3, 2011, pp. 1-13, Publisher: IOP Publishing.

Eggleton et al., "Inducing and Harnessing Stimulated Brillouin Scattering in Photonic Integrated Circuits", Advances in Optics and Photonics 5, Dec. 19, 2013, pp. 536-587, Publisher: Optical Society of America.

European Patent Office, "Extended European Search Report from EP Application No. 17178890.4 dated Jan. 11, 2018", from Foreign Counterpart to U.S. Appl. No. 15/591,747, pp. 1-11, Published: EP.

European Patent Office, "Extended European Search Report from EP Application No. 17178891.2 dated Jan. 11, 2018", from Foreign Counterpart to U.S. Appl. No. 15/591,836, pp. 1-11, Published: EP.

Van Laer, Raphael et al., "Interaction between light and highly confined hypersound in a silicon photonic nanowire", Physics Optics, Jul. 18, 2014, pp. 1-10.

(56) References Cited

OTHER PUBLICATIONS

U.S. Patent and Trademark Office, "Supplemental Notice of Allowability from U.S. Appl. No. 15/630,261 dated Nov. 28, 2018", pp. 1-11, Published in: US.
U.S. Patent and Trademark Office, "Restriction Requirement", U.S. Appl. No. 15/630,261, dated Apr. 23, 2018, pp. 1-6, Published: US.
European Patent Office, "Extended European Search Report from EP Application No. 18168105.7 dated Feb. 18, 2019", from Foreign Counterpart to U.S. Appl. No. 15/630,261, filed Feb. 18, 2019, pp. 1-10, Published: EP.
European Patent Office, "Partial European Search Report from EP Application No. 18168105.7 dated Nov. 16, 2018", from Foreign Counterpart of U.S. Appl. No. 15/630,261, filed Nov. 16, 2018, pp. 1-15, Published in: EP.
Laude et al, "Generation of Photons from Electrostriction in Small-Core Optical Waveguides", AIP Advances 3, 042109, Dated 2013, pp. Cover, 042109-1-042109-12, Publisher:American Institute of Physics.
Laude et al, "Lagrangian Description of Brillouin Scattering and Electrostriction in a Nanoscale Optical Waveguides", New Journal of Physics, Dated 2015, http://iopscience.iop.org/1367-2630/17/12/125003, Downloaded Dec. 12, 2015, Publisher: IOP Publishing.
Li et al., "Characterization of a high coherence, Brillouin microcavity laser on silicon", T.J Watson Laboratory of Applied Physics, California Institute of Technology, 2012, pp. 1-11, Published in: US.
Ma, Tian-Xue, et al., "Acousto-optical interaction of surface acoustic and optical waves in a two-dimensional phoxonic crystal heterostructure cavity", Optics Express, Nov. 17, 2014, pp. 28443-28451, vol. 22, No. 23, Publisher: Optical Society of America.
Mirnaziry et al., "Stimulated Brillouin Scattering in Silicon/Chalcogenide Slot Waveguides", Optics Express, Feb. 25, 2016, pp. 4786-4800, vol. 24, No. 5, Publisher: Optical Society of America.
Normandin et al, "Scattering of Guided Optical Beams by Surface Acoustic WAves in Thin Films", Journal of Optical Society of America, Dated Aug. 1979, pp. 1153-1165, vol. 69, No. 8, Publisher: Optical Society of America.
Pennec et al, "Modeling Light-Sound Interaction in Nanoscale Cavities and Waveguides", Nanophotonics 2014; 3(6), pp. 413-440, Publisher: Science Wise Publishing & De Gruyter.
Poulton et al, "Acoustic Confinement and Stimulated Brillouin Scattering in Integrated Optical Waveguides", Journal of the Optical Society of America B, Oct. 1, 2013, pp. 2657-2664, vol. 30, No. 10, Publisher: Optical Society of America.
Puckett, Matthew et al., "Observation of second-harmonic generation in silicon nitride waveguides through bulk nonlinearities", Optics Express, Jul. 25, 2016, pp. 16923-16933, vol. 24, No. 15, Publisher: Optical Society of America.
Puckett, Matthew, et al., "Silicon nanoridge array waveguides for nonlinear and sensing applications", Optics Express, Nov. 2, 2015, pp. 28224-28233, vol. 23, No. 22, Publisher: Optical Society of America.
Rahman, B.M.A. et al., "Characterization of Acousto-optical Interaction in Planar silica optical waveguide by the finite element method", Journal of the Optical Society of America B, May 1, 2016, pp. 810-818, vol. 33, No. 5, Publisher: Optical Society of America.
Rakich et al, "Traveling-wave Photon-phonon Coupling as the Basis for New Signal Processing Technologies", Micro- and Nanotechnology Sensors, Systems, and Applications VI, pp. 908317-1-908317-12, vol. 9083, Publisher: SPIE.
Robinson, Jacob, "A Dissertation presented to the Faculty of the Graduate School of Cornell University, Nanoscale Light Confinement: Principles, Measurement, and Applications", Dated Jan. 2009, pp. 1-108, : Publisher: Jacob Thomas Robinson.
Rowell et al, "Brillouin Scattering in a Thin Film Waveguide", Applied Physics Letters, 32(3), https://doi.org/10.1063/1.89965, Dated Feb. 1, 1978, pp. Cover,154-155, Publisher: American Institute of Physics.
Sarabalis, Christopher et al., "Guided acoustic and optical waves in silicon-on-insulator for Brillouin scattering and optomechanics", Physics Optics, Apr. 16, 2016, pp. 1-5.
Schmidt, Ronald et al, "Thin Film Acoustic Surface Waveguides on Anisotropic Media", IEEE Transactions on Sonics and Ultrasonics, Dated Mar. 1975, pp. 115-122, vol. SU-22, No. 2, Publisher: IEEE.
Seshadri, "Quasi-optics of the Coupling of Guided Modes in Two Paralles, Indentical Dielectric Waveguides", Journal Optical Society of America, Dated Jun. 1987, pp. 1030-1036, vol. 4, No. 6, Publisher: Optical Society of America.
Shin et al, "Tailorable stimulated Brillouin scattering in nanoscale silicon waveguides," Nature Communications V. 4, Articlenumber: 1944 (2013).
Sriratanavaree S. et al., "Rigorous analysis of acoustic modes in low and high index contrast silica fibers", Applied Optics, Mar. 20, 2015, pp. 2550-2557, vol. 54, No. 9, Publisher: Optical Society of America.
Sriratanavaree S. et al., "Rigorous Characterization of acoustic-optical interactions in silicon slot waveguides by full-vectorial finite element method", Optics Express, Apr. 21, 2014, pp. 9528-9537, vol. 22, No. 8, Publisher: Optical Society of America.
Sriratanavaree, "Characterisation of Acoustic Waves in Optical Waveguides", A Thesis Submitted for the Degree of Doctor of Philosophy, City University London, Jan. 2014, pp. 1-233, UK.
U.S. Patent and Trademark Office, "Advisory Action for U.S. Appl. No. 15/591,747 dated Dec. 31, 2018", pp. 1-4, Published in: US.
U.S. Patent and Trademark Office, "Final Office Action from U.S. Appl. No. 15/591,747 dated Oct. 12, 2018", pp. 1-23, Published in: US.
U.S. Patent and Trademark Office, "Interview Summary", U.S. Appl. No. 15/630,261, filed Nov. 13, 2018, pp. 1-4, Published: US.
U.S. Patent and Trademark Office, "Miscellaneous communication regarding Advisory Action for U.S. Appl. No. 15/591,747 dated Jan. 7, 2019", pp. 1-2, Published in: US.
U.S. Patent and Trademark Office, "Notice of Allowance", U.S. Appl. No. 15/591,836, dated Dec. 20, 2018, pp. 1-26, Published: US.
U.S. Patent and Trademark Office, "Notice of Allowance", U.S. Appl. No. 15/630,261, dated Feb. 5, 2019, pp. 1-19, Published: US.
U.S. Patent and Trademark Office, "Notice of Allowance", U.S. Appl. No. 15/630,261, dated Oct. 10, 2018, pp. 1-37, Published: US.
U.S. Patent and Trademark Office, "Office Action", U.S. Appl. No. 15/591,747, dated May 18, 2018, pp. 1-18, Published: US.
U.S. Patent and Trademark Office, "Office Action", U.S. Appl. No. 15/591,747, dated Dec. 14, 2017, pp. 1-21, Published: US.
U.S. Patent and Trademark Office, "Office Action", U.S. Appl. No. 15/591,836, dated May 31, 2018, pp. 1-38, Published: US.
U.S. Patent and Trademark Office, "Restriction Requirement", U.S. Appl. No. 15/379,165, dated Mar. 24, 2017, Mar. 24, 2019, pp. 1-6, Published: US.
U.S. Patent and Trademark Office, "Restriction Requirement", U.S. Appl. No. 15/591,836, dated Jan. 30, 2018, pp. 1-7, Published: US.
U.S. Patent and Trademark Office, "Restriction Requirement", U.S. Appl. No. 16/357,239, dated Sep. 17, 2019, pp. 1-5, Published: US.
U.S. Patent and Trademark Office, "Notice of Allowance", U.S. Appl. No. 16/357,239, dated Dec. 23, 2019, pp. 1-40, Published: US.

* cited by examiner

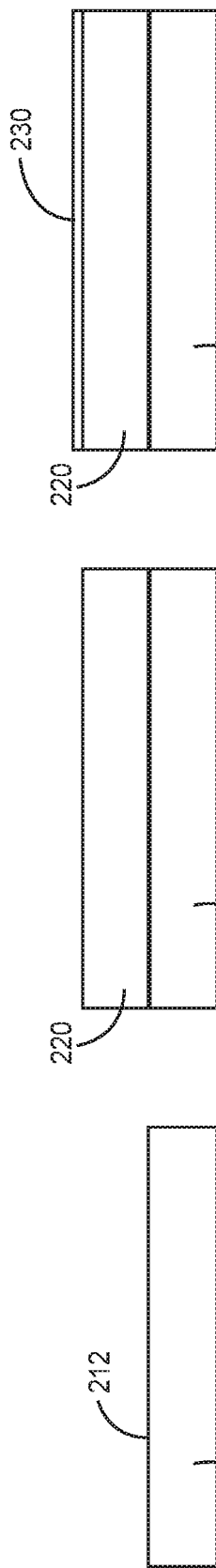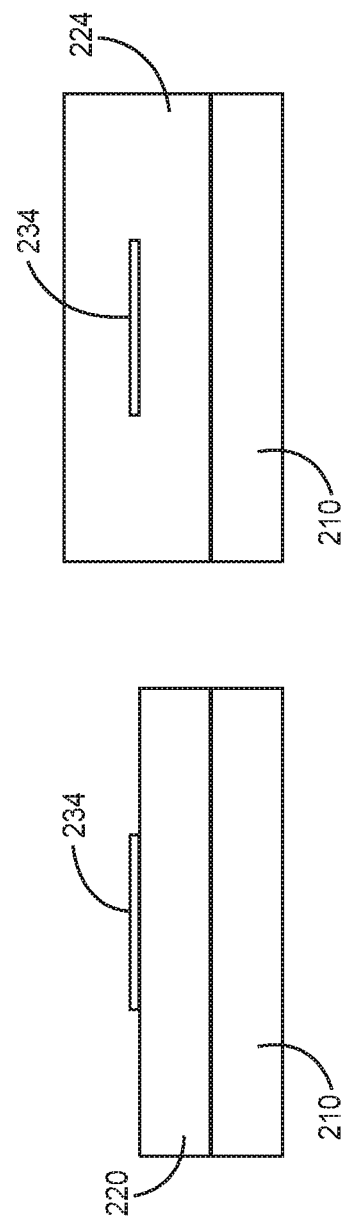

BRILLOUIN GAIN SPECTRAL POSITION CONTROL OF CLADDINGS FOR TUNING ACOUSTO-OPTIC WAVEGUIDES

CROSS REFERENCE TO RELATED APPLICATION

This application is a divisional of U.S. application Ser. No. 15/630,261, filed on Jun. 22, 2017, which is herein incorporated by reference.

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

BACKGROUND

In integrated acousto-optics, control of the spectral position of the Brillouin gain curve is highly desirable. In optical gyroscopes, for example, control of the spectral position of the Brillouin gain curve allows for control of the frequency detuning between clockwise and counterclockwise beams. In other integrated applications, control of the spectral position of the Brillouin gain curve allows for a spectral misalignment between the gain spectrum of the fiber used to excite the waveguides and that of the waveguides themselves, avoiding the complications their overlap would otherwise cause.

In prior approaches, the only structures that allow for control over gain spectra involve a finite number of guided acoustic modes. In these structures, changing the waveguide geometry leads to a change in the dispersion of both the optical and acoustic modes. However, structures which support guided acoustic modes generally do so at the expense of higher optical losses, and the spectral range across which such structures can tune the Brillouin gain curve remains limited.

SUMMARY

A method of fabricating an acousto-optic waveguide that includes a waveguide cladding surrounding an optical core is disclosed. The method comprises providing a wafer substrate having an upper surface; depositing an initial amount of a first material over the upper surface of the wafer substrate to form a partial cladding layer; depositing a second material over the partial cladding layer to form an optical layer; removing portions of the second material of the optical layer to expose portions of the partial cladding layer and form an optical core structure comprising the remaining second material; and depositing an additional amount of the first material over the optical core structure and the exposed portions of the partial cladding layer to form a full cladding layer that surrounds the optical core structure. A relative concentration of components of the first material is adjusted to provide Brillouin gain spectral position control of the waveguide cladding to tune the acousto-optic waveguide.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 2A-2E are end views showing an exemplary method of fabricating an acousto-optic waveguide device;

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods for Brillouin gain spectral position control of waveguide claddings are provided for tuning acousto-optic waveguides. In general, a Brillouin scattering frequency shift of the acousto-optic waveguides may be selected based on various waveguide cladding formation parameters.

In one approach, during formation of the waveguide claddings, the relative concentrations of cladding material components (e.g., nitrogen and oxygen) may be readily altered by changing precursor gas flow rates during deposition. This allows the acoustic velocity supported by the cladding material to be tuned. In another approach, a doping process may be used to change the waveguide cladding material compositions. For example, ion bombardment can be used to change concentrations of cladding material components such as nitrogen and oxygen. In a further approach, the thickness of the waveguide cladding or core material may be changed to adjust the Brillouin gain of the acousto-optic waveguides.

A closed form equation for the Brillouin scattering frequency shift follows:

$$Nu_{Brillouin} = 2 * n_{eff} * v_{ac} / \lambda_0$$

where $Nu_{Brillouin}$ is the Brillouin frequency shift, $n_{eff}$ is the effective index of the guided optical mode, $v_{ac}$ is the acoustic velocity of the guiding material, and $\lambda_0$ is the free-space wavelength of the light. The Brillouin gain is linearly proportional to the acoustic velocity.

The acousto-optic waveguides formed by the present methods have a low loss coefficient, which allows wave-mixing based on Brillouin scattering to occur in longer devices without optical power being scattered or absorbed.

Tuning of the spectral position of the Brillouin gain is useful in various integrated photonics applications. For example, in an integrated optical gyroscope, the tuning of the spectral position of the Brillouin gain can be used to control the frequency detuning between clockwise and counterclockwise beams. The present techniques can also be used to implement a Brillouin waveguide laser.

Further details of the acousto-optic waveguide device and method for fabrication are described hereafter with reference to the drawings.

Figure 1:
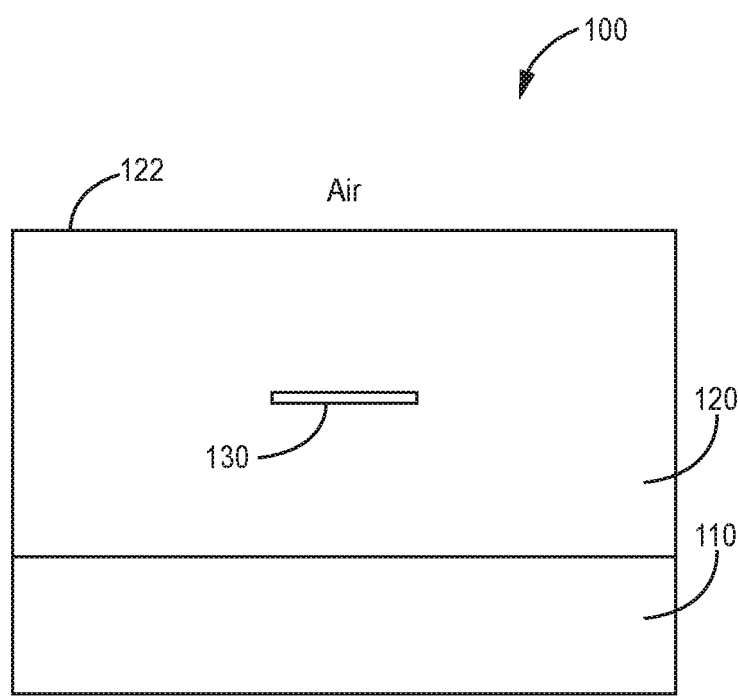
FIG. 1 is a cross-sectional end view of an acousto-optic waveguide device, according to one embodiment.

FIG. 1 illustrates an acousto-optic waveguide device 100, according to one embodiment. The waveguide device 100 generally includes a substrate 110, a cladding layer 120 over substrate 110, and an optical core 130 embedded in and surrounded by cladding layer 120. An upper surface 122 of cladding layer 120 is exposed to air.

The optical core 130 can be composed of various materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate (LiNbO$_3$), or combinations thereof. The optical core 130 can be formed to have a thickness of about 40 nm to about 200 nm, for example.

The cladding layer 120 can be composed of various materials, such as silicon oxynitride, silicon dioxide (SiO$_2$), silicon nitride, germanium oxide (GeO$_2$), zinc oxide (ZnO), aluminum oxide (Al$_2$O$_3$), titanium dioxide (TiO$_2$), magnesium oxide (MgO), or combinations thereof. The cladding layer 120 can be formed to have a thickness of about 6 microns to about 40 microns, for example.

The substrate 110 can be composed of any wafer material that is atomically flat, such as any of the above materials. In one exemplary embodiment, substrate 110 and optical core 130 are composed of silicon, and cladding layer 120 is composed of silicon oxynitride.

Various conventional processes may be employed to form the layers of the waveguide device, such as plasma-enhanced chemical vapor deposition (PECVD), high-density-plasma chemical vapor deposition (HDPCVD), low-pressure chemical vapor deposition (LPCVD), sputtering, atomic layer deposition, or the like.

As described further hereafter, the composition of the cladding layer can be varied in order to tune the acoustic velocity supported by the cladding layer. For example, flow rates of precursor gases (e.g., SiH$_4$, N$_2$O, NH$_3$) such as used during silicon oxynitride deposition steps can be used to determine the relative concentration of nitrogen and oxygen in the formed cladding layer, thereby controlling the position of the Brillouin gain peak.

Other properties that can be tailored include fabrication of the respective layer materials to be amorphous or crystalline.

FIGS. 2A-2E depict an exemplary method of fabricating an acousto-optic waveguide device. Fabrication of the waveguide device begins with a wafer substrate 210 having an upper surface 212, as shown in FIG. 2A. The wafer substrate 210 can be formed of a first material comprising, for example, silicon.

Next, an initial amount of a second material is deposited over upper surface 212 of wafer substrate 210 to form a partial cladding layer 220, as shown in FIG. 2B. For example, partial cladding layer 220 can be formed by depositing about 3 microns to about 20 microns of a dielectric material such as silicon oxynitride.

Thereafter, a third material is deposited over partial cladding layer 220 to form an optical layer 230, as depicted in FIG. 2C. For example, optical layer 230 can be formed by depositing about 40 nm to about 200 nm of a high-refractive index dielectric material. In one implementation, the dielectric material of optical layer 230 is amorphous silicon.

As shown in FIG. 2D, an optical core structure 234 is formed by removing portions of the third material of optical layer 230 to expose portions of partial cladding layer 220, with optical core structure 234 comprising the remaining third material. For example, optical core structure 234 can be formed by etching optical layer 230, such as through conventional electron-beam lithography or photolithography-based procedures.

An additional amount of the second material is then deposited over optical core structure 234 and the exposed portions of partial cladding layer 220 to form a full cladding layer 224 that surrounds optical core structure 234, as depicted in FIG. 2E. For example, the additional amount of the second material can be about 3 microns to about 20 microns of a dielectric material such as silicon oxynitride.

Figure 3:
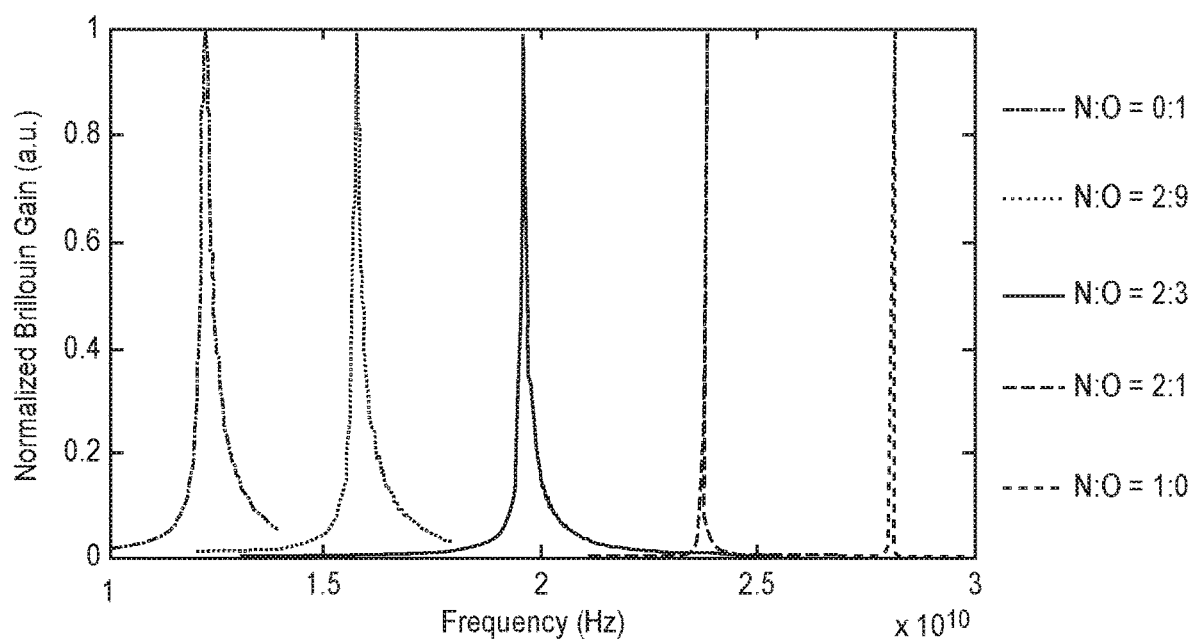
FIG. 3 is a graph of simulated Brillouin gain with respect to frequency for an acousto-optic waveguides with different cladding materials.

As mentioned previously, the composition of the cladding layer can be varied in order to tune the acoustic velocity supported by the cladding layer. This is illustrated in FIG. 3, which is a graph of simulated Brillouin gain with respect to frequency for acousto-optic waveguides formed with different cladding materials, assuming a guiding region that is a 40 nm-thick and 6.5 micron-wide silicon section. The ratios of N:O in the different cladding materials are 0:1 (pure silicon dioxide), 2:9 (silicon oxynitride), 2:3 (silicon oxynitride), 2:1 (silicon oxynitride), and 1:0 (pure silicon nitride).

As shown in FIG. 3, the Brillouin gain is maximized at different frequencies, depending on the composition of the cladding material. In this example, the Brillouin gain peak may be tuned from about 12 GHz to about 27 GHz. This allows the acoustic velocity of the waveguides to be tuned from about 5968 m/s (for pure silicon dioxide) to approximately 11000 m/s (for pure silicon nitride).

The acousto-optic waveguide device disclosed herein may be used, for example, in an integrated photonics circuit, in either a straight waveguide or a resonator, to couple energy from a forward propagating pump wave into a counter-propagating Stokes wave. This process may be cascaded multiple times, corresponding to the generation of higher-order Stokes waves propagating in alternating directions. The Stokes waves may act as carriers for data encoded in the optical regime, may serve to monitor the Sagnac effect in optical gyroscopes, or may monitor the temperature and stress in the constituent integrated photonics circuit.

Figure 4:
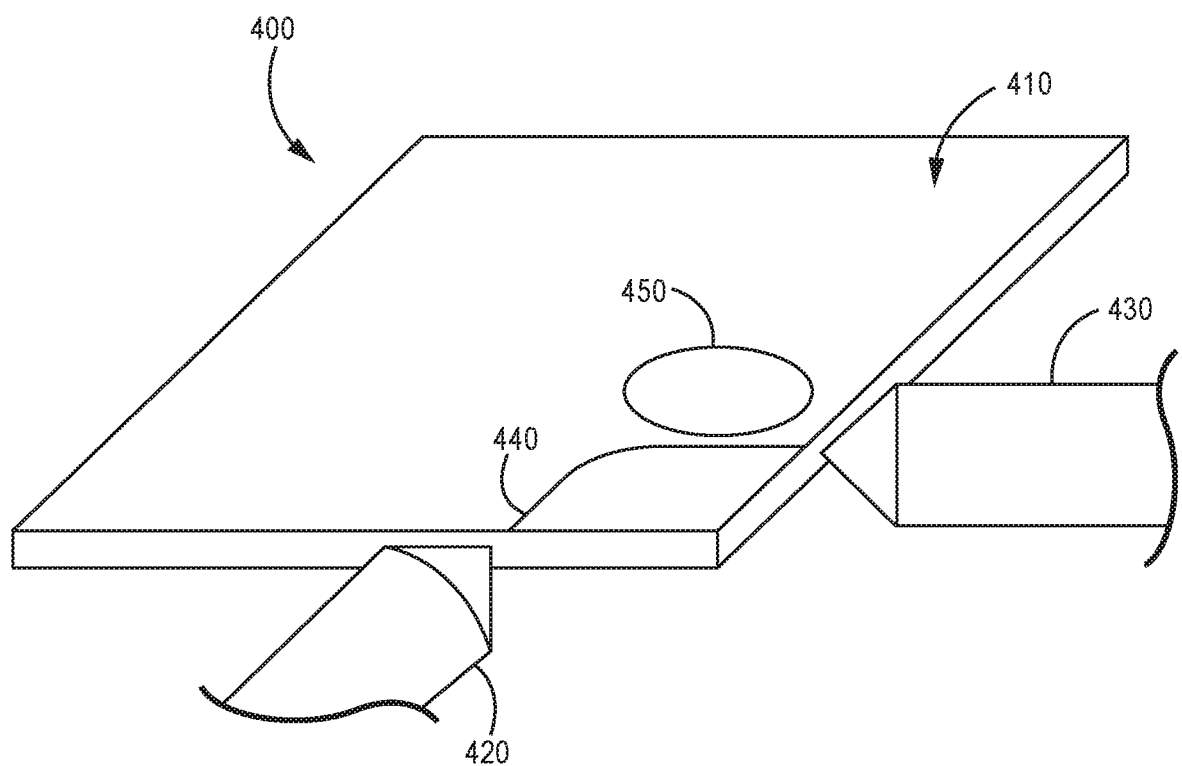
FIG. 4 schematically illustrates an integrated fiber optic gyroscope that can employ an acousto-optic waveguide, according to an exemplary embodiment.

FIG. 4 illustrates an example of an integrated fiber optic gyroscope 400, which can employ the acousto-optic waveguide device. The fiber optic gyroscope 400 includes an integrated photonics circuit or chip 410, which is in optical communication with an input optical fiber 420 and an output optical fiber 430. The input optical fiber 420 directs a light beam from a source to an acousto-optic waveguide 440 in chip 410. Counter-propagating light beams are generated in one or more ring resonators 450 coupled to acousto-optic waveguide 440 in chip 410. The beat frequencies of the counter-propagating light beams are used to determine the rate of rotation based on output optical signals received by output optical fiber 430.

Figure 5:
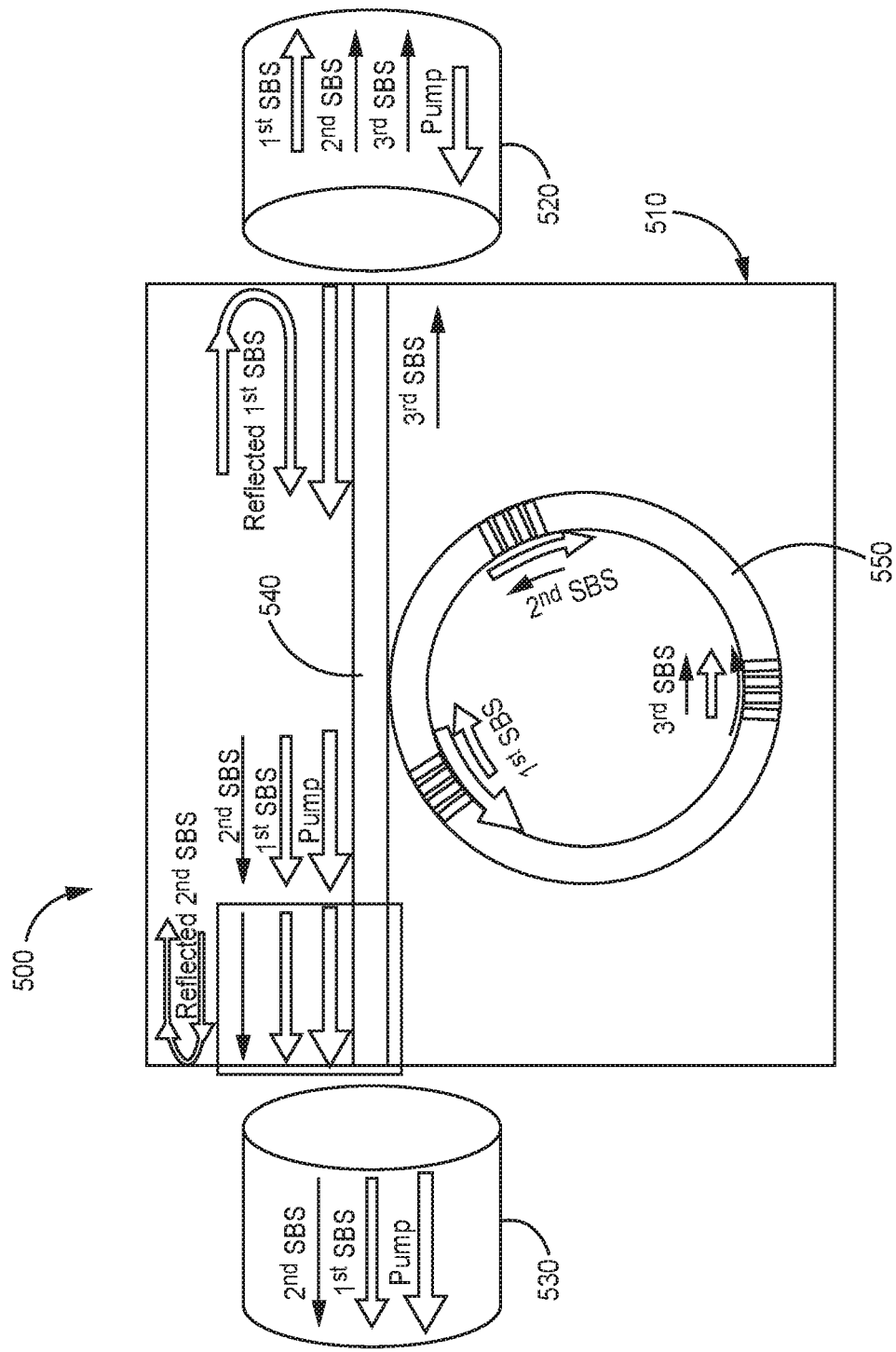
FIG. 5 schematically illustrates a Brillouin waveguide laser device, which is implemented with acousto-optic waveguides, according to an exemplary embodiment.

The acousto-optic waveguide device disclosed herein may also be used in a Brillouin waveguide laser. For example, FIG. 5 illustrates a Brillouin waveguide laser device 500, which includes an integrated photonics chip 510 in optical communication with a first optical fiber 520 and a second optical fiber 530. The chip 510 includes an acousto-optic waveguide bus 540, and an acousto-optic waveguide resonator 550 that is optically coupled to waveguide bus 540.

During operation of laser device 500, fiber 520 couples pump light onto waveguide bus 540. The pump light then couples into resonator 550 and, if the frequency of the pump light matches the resonance frequency of resonator 550, the optical power density within resonator 550 builds up. Beyond a certain threshold power, the pump light will create a moving acoustic grating that the pump light can reflect from, leading to lasing of the $1^{st}$-order Brillouin wave (stimulated Brillouin scattering (SBS)), which will be downshifted in frequency from the pump light. For this to happen, it is additionally required that the separation between resonances of resonator 550 match the frequency shift corresponding to Brillouin scattering in the guiding material of the waveguide. The $1^{st}$-order Brillouin wave will travel in the opposite direction of the pump light, and if enough power is transferred into the pump light, the effect will cascade, leading to the lasing of higher-order Brillouin waves ($2^{nd}$-order SBS and $3^{rd}$-order SBS) traveling in alternating directions. The odd-ordered Brillouin waves will couple back into fiber 520, whereas the even-ordered Brillouin waves as well as the excess pump light will couple into fiber 530.

EXAMPLE EMBODIMENTS

Example 1 includes a method of fabricating an acousto-optic waveguide that includes a waveguide cladding surrounding an optical core, the method comprising: providing a wafer substrate having an upper surface; depositing an initial amount of a first material over the upper surface of the wafer substrate to form a partial cladding layer; depositing a second material over the partial cladding layer to form an optical layer; removing portions of the second material of the optical layer to expose portions of the partial cladding layer and form an optical core structure comprising the remaining second material; and depositing an additional amount of the first material over the optical core structure and the exposed portions of the partial cladding layer to form a full cladding layer that surrounds the optical core structure; wherein a relative concentration of components of the first material is adjusted to provide Brillouin gain spectral position control of the waveguide cladding to tune the acousto-optic waveguide.

Example 2 includes the method of Example 1, wherein the first material comprises silicon oxynitride, silicon dioxide, silicon nitride, germanium oxide, zinc oxide, aluminum oxide, titanium dioxide, magnesium oxide, or combinations thereof.

Example 3 includes the method of any of Examples 1-2, wherein the second material comprises silicon, silicon nitride, silicon oxynitride, silicon carbide, diamond, silicon germanium, germanium, gallium arsenide, gallium nitride, gallium phosphide, lithium niobate, or combinations thereof.

Example 4 includes the method of any of Examples 1-3, wherein the first material and the second material are deposited using a process comprising plasma enhanced chemical vapor deposition (PECVD), high-density-plasma chemical vapor deposition (HDPCVD), low-pressure chemical vapor deposition (LPCVD), sputtering, or atomic layer deposition.

Example 5 includes the method of any of Examples 1-4, wherein the portion of the second material is removed by a process comprising electron-beam lithography or a photolithography-based procedure.

Example 6 includes the method of any of Examples 1-5, wherein the partial cladding layer is formed by depositing about 3 microns to about 20 microns of the first material.

Example 7 includes the method of any of Examples 1-6, wherein the optical layer is formed by depositing about 40 nm to about 200 nm of the second material.

Example 8 includes the method of any of Examples 1-7, wherein the full cladding layer is formed by depositing about 3 microns to about 20 microns of the additional amount of the first material.

Example 9 includes the method of any of Examples 1-8, wherein the relative concentration of components of the first material is adjusted by selectively changing precursor gas flow rates during the deposition of the initial and additional amounts of the first material.

Example 10 includes the method of any of Examples 1-8, wherein the relative concentration of components of the first material is adjusted by doping the initial and additional amounts of the first material using ion bombardment.

Example 11 includes the method of any of Examples 1-10, wherein the acousto-optic waveguide is fabricated as part of an integrated photonics chip.

Example 12 includes the method of Example 11, wherein the integrated photonics chip is implemented as part of a fiber optic gyroscope.

Example 13 includes the method of Example 11, wherein the integrated photonics chip is implemented as part of a Brillouin waveguide laser.

Example 14 includes a Brillouin waveguide laser device comprising an integrated photonics chip that comprises: an acousto-optic waveguide bus, and an acousto-optic waveguide resonator optically coupled to the acousto-optic waveguide bus; a first optical fiber in optical communication with the integrated photonics chip through the acousto-optic waveguide bus; and a second optical fiber in optical communication with the integrated photonics chip through the acousto-optic waveguide bus. The first optical fiber is configured to direct pump light onto the acousto-optic waveguide bus such that the pump light is coupled into the acousto-optic waveguide resonator. When a frequency of the pump light matches a resonance frequency of acousto-optic waveguide resonator, an optical power density within the acousto-optic waveguide resonator builds up such that beyond a certain threshold power, the pump light will create a moving acoustic grating in the acousto-optic waveguide resonator that the pump light reflects from, thereby producing lasing of a first order Brillouin wave that is sent to the second optical fiber. A separation between resonances of the acousto-optic waveguide resonator matches a frequency shift corresponding to Brillouin scattering in a guiding material of the acousto-optic waveguide bus and the acousto-optic waveguide resonator.

Example 15 includes the Brillouin waveguide laser device of Example 14, wherein when additional power is transferred into the pump light to create a cascade effect, lasing of higher-order Brillouin waves is produced that travel in alternating directions.

Example 16 includes the Brillouin waveguide laser device of any of Examples 14-15, wherein the acousto-optic waveguide bus and the acousto-optic waveguide resonator each include a waveguide cladding surrounding an optical core.

Example 17 includes the Brillouin waveguide laser device of Example 16, wherein the waveguide cladding comprises silicon oxynitride, silicon dioxide, silicon nitride, germanium oxide, zinc oxide, aluminum oxide, titanium dioxide, magnesium oxide, or combinations thereof.

Example 18 includes the Brillouin waveguide laser device of any of Examples 16-17, wherein the optical core comprises silicon, silicon nitride, silicon oxynitride, silicon carbide, diamond, silicon germanium, germanium, gallium arsenide, gallium nitride, gallium phosphide, lithium niobate, or combinations thereof.

Example 19 includes the Brillouin waveguide laser device of any of Examples 16-18, wherein the waveguide cladding has a thickness of about 6 microns to about 40 microns.

Example 20 includes the Brillouin waveguide laser device of any of Examples 16-19, wherein the optical core has a thickness of about 40 nm to about 200 nm.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of fabricating an acousto-optic waveguide that includes a waveguide cladding surrounding an optical core, the method comprising:
   providing a wafer substrate having an upper surface;
   depositing an initial amount of a first material over the upper surface of the wafer substrate to form a partial cladding layer;
   depositing a second material over the partial cladding layer to form an optical layer;
   removing portions of the second material of the optical layer to expose portions of the partial cladding layer and form an optical core structure comprising the remaining second material; and
   depositing an additional amount of the first material over the optical core structure and the exposed portions of the partial cladding layer to form a full cladding layer that surrounds the optical core structure;
   wherein a relative concentration of components of the first material is adjusted to provide Brillouin gain spectral position control of the waveguide cladding to tune the acousto-optic waveguide;
   wherein the relative concentration of components of the first material is adjusted by selectively changing precursor gas flow rates during the deposition of the initial and additional amounts of the first material.

2. The method of claim 1, wherein the first material comprises silicon oxynitride, silicon dioxide, silicon nitride, germanium oxide, zinc oxide, aluminum oxide, titanium dioxide, magnesium oxide, or combinations thereof.

3. The method of claim 1, wherein the second material comprises silicon, silicon nitride, silicon oxynitride, silicon carbide, diamond, silicon germanium, germanium, gallium arsenide, gallium nitride, gallium phosphide, lithium niobate, or combinations thereof.

4. The method of claim 1, wherein the first material and the second material are deposited using a process comprising plasma enhanced chemical vapor deposition (PECVD), high-density-plasma chemical vapor deposition (HDP-CVD), low-pressure chemical vapor deposition (LPCVD), sputtering, or atomic layer deposition.

5. The method of claim 1, wherein the portion of the second material is removed by a process comprising electron-beam lithography or a photolithography-based procedure.

6. The method of claim 1, wherein the partial cladding layer is formed by depositing about 3 microns to about 20 microns of the first material.

7. The method of claim 1, wherein the optical layer is formed by depositing about 40 nm to about 200 nm of the second material.

8. The method of claim 1, wherein the full cladding layer is formed by depositing about 3 microns to about 20 microns of the additional amount of the first material.

9. The method of claim 1, wherein the acousto-optic waveguide is fabricated as part of an integrated photonics chip.

10. The method of claim 9, wherein the integrated photonics chip is implemented as part of a fiber optic gyroscope.

11. The method of claim 9, wherein the integrated photonics chip is implemented as part of a Brillouin waveguide laser.

12. A method of fabricating an acousto-optic waveguide that includes a waveguide cladding surrounding an optical core, the method comprising:
    providing a wafer substrate having an upper surface;
    depositing an initial amount of a first material over the upper surface of the wafer substrate to form a partial cladding layer;
    depositing a second material over the partial cladding layer to form an optical layer;
    removing portions of the second material of the optical layer to expose portions of the partial cladding layer and form an optical core structure comprising the remaining second material; and
    depositing an additional amount of the first material over the optical core structure and the exposed portions of the partial cladding layer to form a full cladding layer that surrounds the optical core structure;
    wherein a relative concentration of components of the first material is adjusted to provide Brillouin gain spectral position control of the waveguide cladding to tune the acousto-optic waveguide;
    wherein the relative concentration of components of the first material is adjusted by doping the initial and additional amounts of the first material using ion bombardment.

13. The method of claim 12, wherein the first material comprises silicon oxynitride, silicon dioxide, silicon nitride, germanium oxide, zinc oxide, aluminum oxide, titanium dioxide, magnesium oxide, or combinations thereof.

14. The method of claim 12, wherein the second material comprises silicon, silicon nitride, silicon oxynitride, silicon carbide, diamond, silicon germanium, germanium, gallium arsenide, gallium nitride, gallium phosphide, lithium niobate, or combinations thereof.

15. The method of claim 12, wherein the first material and the second material are deposited using a process comprising plasma enhanced chemical vapor deposition (PECVD), high-density-plasma chemical vapor deposition (HDP-CVD), low-pressure chemical vapor deposition (LPCVD), sputtering, or atomic layer deposition.

16. The method of claim 12, wherein the partial cladding layer is formed by depositing about 3 microns to about 20 microns of the first material.

17. The method of claim 12, wherein the optical layer is formed by depositing about 40 nm to about 200 nm of the second material.

18. The method of claim 12, wherein the full cladding layer is formed by depositing about 3 microns to about 20 microns of the additional amount of the first material.

19. The method of claim 12, wherein the acousto-optic waveguide is fabricated as part of an integrated photonics chip.

20. The method of claim 19, wherein the integrated photonics chip is implemented as part of a Brillouin waveguide laser.

* * * * *